United States Patent
Bracher et al.

(10) Patent No.: US 10,306,013 B2
(45) Date of Patent: May 28, 2019

(54) CHURN RISK SCORING USING CALL NETWORK ANALYSIS

(71) Applicant: SAP SE, Walldorf (DE)

(72) Inventors: Shane Bracher, Morningside (AU); Mark Daniel Holmes, Paddington (AU); Liam Alexander Mischewski, Brisbane (AU); Asadul Khandoker Islam, Coorparoo (AU); Michael McClenaghan, Brisbane (AU); Daniel Ricketts, Toowong (AU); Glenn Neuber, New Farm (AU); Hoyoung Jeung, Tennyson (AU); Priya Vijayarajendran, Saratoga, CA (US)

(73) Assignee: SAP SE, Waldorf (DE)

( * ) Notice: Subject to any disclaimer, the term of this patent is extended or adjusted under 35 U.S.C. 154(b) by 739 days.

(21) Appl. No.: 14/800,255

(22) Filed: Jul. 15, 2015

(65) Prior Publication Data
US 2017/0017908 A1    Jan. 19, 2017

(51) Int. Cl.
*H04L 29/08* (2006.01)
*G06Q 10/06* (2012.01)
*G06Q 30/02* (2012.01)
*H04M 15/00* (2006.01)
*H04M 3/51* (2006.01)

(52) U.S. Cl.
CPC ....... *H04L 67/322* (2013.01); *G06Q 10/0635* (2013.01); *G06Q 30/02* (2013.01); *H04L 67/02* (2013.01); *H04L 67/10* (2013.01); *H04L 67/12* (2013.01); *H04M 3/5175* (2013.01); *H04M 15/43* (2013.01)

(58) Field of Classification Search
None
See application file for complete search history.

(56) References Cited

U.S. PATENT DOCUMENTS 7,571,191 B2    8/2009    Dill et al.
7,813,951 B2    10/2010   Eskandari
(Continued)

OTHER PUBLICATIONS

SAS Institute Inc.,"Smarter campaigns, lower churn", retrieved from http://www.sas.com/en_us/customers/tmobile.html on Feb. 26, 2015, 5 pages.
(Continued)

*Primary Examiner* — Gurkanwaljit Singh
(74) *Attorney, Agent, or Firm* — Mintz Levin Cohn Ferris Glovsky and Popeo PC (57) ABSTRACT

Customer churn risk scores are based on a multi-variable churn risk model relating customer and customer account characteristics to a risk of customer churn. A computer-implemented method of generating and presenting churn risk scores of customers of a telecommunication provider involves analyzing, on an in-memory database platform, customer call data records and customer records to calculate a churn likelihood value, an influence factor value, and an average spend value for each customer. The method assigns a churn risk score to each customer according to the model using the calculated churn likelihood value, the calculated influence factor value, and the calculated average spend value as input to the model. The churn risk scores for one or more customers are displayed visually on an interactive computer-user interface (UI).

20 Claims, 8 Drawing Sheets

(56) References Cited

U.S. PATENT DOCUMENTS

| | | |
|---|---|---|
| 8,265,992 B1 | 9/2012 | Seshadri et al. |
| 8,385,906 B2 | 2/2013 | Kumar et al. |
| 8,630,892 B2* | 1/2014 | Bhalla .................. G06Q 30/02 705/7.31 |
| 8,744,898 B1 | 6/2014 | Hewett et al. |
| 9,420,100 B2* | 8/2016 | Bellini ................ G06Q 10/063 |
| 2004/0215656 A1* | 10/2004 | Dill .................. G06F 17/30539 |
| 2009/0157449 A1 | 6/2009 | Itani et al. |
| 2009/0190729 A1 | 7/2009 | Chakraborty et al. |
| 2009/0192809 A1 | 7/2009 | Chakraborty et al. |
| 2010/0223099 A1* | 9/2010 | Johnson ................ G06Q 10/04 705/7.28 |
| 2012/0053990 A1 | 3/2012 | Pereg et al. |
| 2012/0143735 A1* | 6/2012 | Pascal Leo ............ G06Q 30/04 705/34 |
| 2013/0054306 A1* | 2/2013 | Bhalla .................. G06Q 30/02 705/7.31 |
| 2013/0054479 A1 | 2/2013 | Ross et al. |
| 2013/0185245 A1 | 7/2013 | Anderson et al. |
| 2014/0006106 A1 | 1/2014 | Malov et al. |
| 2014/0074784 A1 | 3/2014 | Mao et al. |
| 2014/0114722 A1 | 4/2014 | Mohan et al. |
| 2017/0006135 A1* | 1/2017 | Siebel .................. H04L 67/02 |

OTHER PUBLICATIONS

Oracle Business Intelligence, "Be the First to Know", retrieved from www.oracle.com/bi, on Mar. 3, 2015, 19 pages.

\* cited by examiner

510
Presenting churn risk scores for customers of a telecommunication provider, the churn risk scores based on a multi-variable churn risk model, the model relating customer and customer account characteristics to a risk of customer churn

520
Analyzing customer call data records and customer records to calculate a churn likelihood value, an influence factor value, and an average spend value for each customer

530
Assigning a churn risk score to each the customer according to the model using the calculated churn likelihood value, the calculated influence factor value, and the calculated average spend value

540
Displaying the churn risk scores for one or more customers visually on an interactive computer-user interface (UI).

FIG. 5

CHURN RISK SCORING USING CALL NETWORK ANALYSIS

BACKGROUND

Computer systems can run computer programs (e.g., "business applications") to perform various business functions. These business applications (e.g., applications for customer relationship management, human resource management, outsourcing relationship management, field service management, enterprise resource planning (ERP), enterprise content management (ECM), business process management (BPM), product lifecycle management, etc.) may be used to increase productivity, to measure productivity and to perform the business functions accurately. Business applications can be used to analyze large amounts of data to generate or monitor business metrics that measure an organization's business activities and performance.

Business entities or service providers (e.g., banks, telephone companies, Internet service providers, pay TV companies, insurance companies, and alarm monitoring services, publishing, investment services, insurance, electric utilities, health care providers, credit card providers, online services and cable services operators, etc.) may have a large number of clients or customers at any given time. These service providers often use customer attrition analysis and customer attrition rates as one of their key business metrics because the cost of retaining an existing customer or client is far less than acquiring a new one. These service providers often have customer service branches which attempt to win back defecting clients, because recovered long-term customers can be worth much more to the service providers than newly recruited clients.

Consideration is now being given to model analysis, and systems and methods for reducing customer attrition by analyzing and responding to customer behaviors.

SUMMARY

Computer-implemented systems and methods for generating and presenting churn risk scores of customers of a telecommunication provider are described herein. The churn risk scores are based on a multi-variable churn risk model relating customer and customer account characteristics to a risk of customer churn In a general aspect, a system includes an in-memory platform, which hosts or supports a web-based churn risk analytics application configured to display visual call network analysis or information on a UI of a client device. The client device includes a web browser, which may present or access the web-based churn risk analytics application web site or web page through which a user may interact with or control operation of the web-based churn risk analytics application. The web browser includes a scripting framework (e.g., class libraries and runtime environment) which provides scripting language support within, for example, the churn risk analytics application. The web browser may further include rendering agents (e.g., a 3D rendering agent and a 2D-rendering agent) configured to render view scripts on UI, for example, as 3D graphs, 2D graphs or 2D charts.

The in-memory platform of the foregoing system includes a web server and a database, which may store data (e.g., call data records, customer data, etc.) that may be consumed in or generated by the churn risk analysis. The web server 450 may store web files (e.g., scripts, styles and layout), which may be used, for example, to construct the churn risk analytics application web site or web page through which the user may interact with or control operation of the churn risk analytics application. The web server also include a data endpoint (e.g., a URL), which may serve as an entry point for a web service requested by other entities (e.g., the web browser).

In an aspect, the web-based churn risk analytics application includes one or more components for data presentation or visualization services (e.g., a 3-D visualization component service, a graph component service and a 2-D Chart component service, etc.) supervised by a controller. The controller can (e.g. in response to a user interaction/event handler in the web browser) command or request one or more application services (e.g., a 3-D visualization component service, graph component service and 2-D Chart component service) for view scripts to display information on UI (e.g., as a 3D graph, a 2D graph, a table, a list, a chart, etc.).

In a general aspect, a method includes analyzing, on an in-memory database platform, customer call data records and customer records to calculate a churn likelihood value, an influence factor value, and an average spend value for each customer. The method further includes assigning a churn risk score to each customer according to the model using the calculated churn likelihood value, the calculated influence factor value, and the calculated average spend value as input to the model.

In an aspect, the method involves displaying the churn risk scores for one or more customers visually on an interactive computer-user interface (UI). Displaying the churn risk scores for one or more customers visually on an interactive computer-user interface includes displaying a calculation view on the UI and consuming the calculation view in analyzing customer call data records and customer records via Open Data Protocol (OData).

In a further aspect, the method includes displaying the churn risk scores in a 3-dimensional graph with the churn likelihood, the influence factor, and the average spend variables as the three graph axes, respectively The details of one or more implementations are set forth in the accompanying drawings and the description below. Further features of the disclosed subject matter, its nature and various advantages will be more apparent from the accompanying drawings, the following detailed description, and the appended claims.

DETAILED DESCRIPTION

Systems and methods for predicting customer attrition (also known as customer churn) are described herein. The systems and methods may be used to identify business customers likely to churn early on so that the business (e.g., a telecommunications provider) can initiate retention initiatives to maintain the loyalty of these customers and discourage or preempt churning.

The systems and methods for predicting customer attrition may be based on an analytical multi-variable model of customer behavior and characteristics related to customer churn ("churn model"). The churn model may involve determining or scoring a quantitative risk (e.g. a churn risk or churn likelihood) that an individual customer of the business (e.g., a telecommunications provider) is likely to defect and switch to another provider. The churn risk may be modeled as a function of one or more behavioral and/or business variables (e.g., customer influence, customer calling patterns, average revenue per customer, etc.). Multiple churn risk metrics or scores may be evaluated or predicted for a customer or customer account.

For the example telecommunications provider, the model may include data analysis of call data records that may be maintained by telecommunications provider. Social network analysis techniques may be applied to the call data records to identify and extract customer-customer interactions (e.g., a customer's social links or calling patterns or "call network") that may have a bearing on customer churn. Additional data sources (e.g. billing records, product records, customer records, etc.) may be included in the data analysis.

A business analytics application ("churn risk analytics application") may be programmed or coded to conduct real time or near real time data analysis to identify high churn risk customers of a business entity based on the churn model, in accordance with the principles of the present disclosure.

The churn risk analytics application may use the churn model to predict customer churn by assessing customer propensity to churn. The churn risk analytics application may generate a prioritized list of potential defectors (churn candidates), which may enable the business entity to, for example, effectively focus customer retention marketing programs on a subset of its customer base who are most vulnerable to churn. The churn risk analytics application, which may be hosted on one or more computers and connected to one or more databases, may include an interactive frontend or user interface (UI), for example, to receive user input guiding the data analysis and to present data analysis results.

For the example case where the business entity is a telecommunications provider, the churn risk analytics application may process business data (call network data, billing records, product records, and customer records) in the telecommunications provider's databases (or other databases) to generate customer churn risk scores and identify "at-risk" customers in real time or near real time. In an example implementation of the churn risk analytics application, the UI may be configured to present one or more churn risk scores and churn risk calculations (and other data) as a model-based three dimensional (3-D) visualization (e.g., image, diagram, graph, or animation) with drill-down support to illustrate the individual call networks of "at-risk" customers, in accordance with the principles of the present disclosure.

Figure 1:
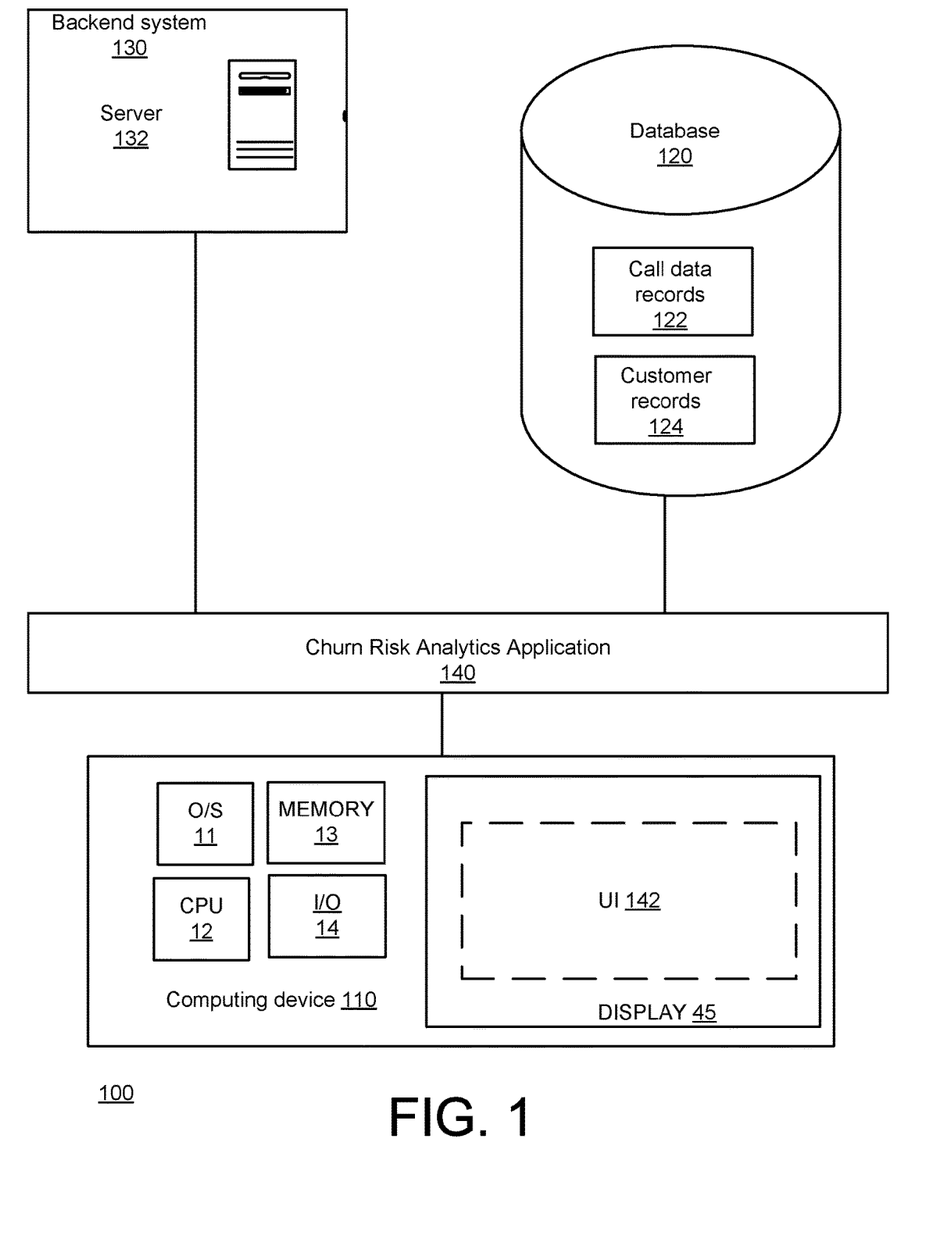
FIG. 1 is a schematic block diagram illustration of an example system, which includes a churn risk analytics application with a frontend user interface having a model-based three dimensional (3-D) visualization capabilities, in accordance with the principles of the present disclosure.

FIG. 1 is a schematic block diagram showing an example system 100 including a churn risk analytics application (e.g., churn risk analytics application 140) with a frontend user interface (e.g., UI 142) having a model-based three dimensional (3-D) visualization capabilities, in accordance with the principles of the present disclosure.

System 100 may include churn risk analytics application 140 coupled to one or more databases (e.g., a business database 120). Business database 120 may include business data including, for example, customer records, call data records (CDR), billing records, product or services records, etc. In the context of the telecommunication industry, an important source of data may be the CDR, which may provide metadata for each communication (e.g., a phone call) on the telecommunication network, including origin, destination, call type, timestamp and duration of the communication. By analyzing the CDR, a network of social links among callers/customers can be mapped. The resulting social network can then be examined using social network analysis techniques to determine, for example, social network characteristics or measures such as connectedness, betweenness centrality (which is an indicator of a node's centrality in a network), eigenvector centrality, etc. Customers who are well-connected and "popular" on the social network may be identified as being influential customers. Intuitively, when influential customers churn, the probability of churning by other customers (i.e. socially connected and influenced customers) may also be expected to increase.

Churn risk analytics application 140 may be coded to process or analyze the business data to generate a churn risk score for customers of the business entity based on an empirical multi-variable churn risk model. In expectation of high data volumes (e.g., terabytes of data) that may be consumed or analyzed, churn risk analytics application 140 may be hosted or run on an in-memory data platform that is deployable, for example, as an on-premise appliance, or in the cloud (e.g. SAP HANA).

In an illustrative example implementation of system 100, churn risk analytics application 140 may, for example, be hosted or launched on a computer 110. Computer 110, which includes an O/S 11, a CPU 12, a memory 13, and I/O 14, may further include a user interface or display screen (e.g., display 15). Although computer 110 is illustrated in the example of FIG. 1 as a single computer, it may be understood that computer 110 may represent two or more computers in communication with one another. Therefore, it will also be appreciated that any two or more components 120-140 of system 100 may similarly be executed using some or all of the two or more computers in communication with one another. Conversely, it also may be appreciated that various components illustrated as being external to computer 110 may actually be implemented therewith. In an example scenario, business application 140 may be an application, which can run on computer 110 or, for example, in another computing environment (e.g., backend system 130/server 132).

As noted previously, churn risk analytics application 140 may use a multi-variable churn risk model to assess or evaluate churn risk. In an example churn risk model for the telecommunications industry, churn risk may be considered to be a function of three variables, e.g., churn likelihood, customer influence and average customer spend. The model may be used in churn risk application 140 to calculate a churn risk score for each customer of a telecommunications provider. Churn risk analytics application 140 may present the calculation results on frontend UI 142 having a model-based three dimensional (3-D) visualization capabilities. Churn risk analytics application 140/UI 142 may be configured to display call network calculations or analysis, to allow a viewer to visually identify high-risk churn customers and to drill-down for calculation details Example Implementation Applicants (and assignee) have implemented a demonstrative example of system 100/churn risk analytics application 140 (for the telecommunications industry) on an in-memory database platform having advanced data processing capabilities, application development support and business analytics across big data. The platform includes parallel data processing within a single in-memory column-based data store with ACID (Atomicity, Consistency, Isolation, Durability) compliance. In particular, the demonstrative example of system 100/churn risk analytics application 140 uses a 4 TB SAP HANA cluster containing 4 nodes, each with 1 TB of memory. Each node has 8 CPUs and a total of 80 cores. The installed version is SAP HANA SPS08 operating on SUSE Linux Enterprise 11.2.

In the demonstrative example implementation of system 100/churn risk analytics application 140 for the telecommunications industry, data analysis and modeling may be performed using a simplified telecommunications billing system database model that is compliant with the TM Forum Information Framework (SID). The database model utilizes two data sources—call data records (CDR) and customer records. The customer records for each customer may include a commencement or start date (i.e. as a customer), a termination date (if churned), identification of family members (if they are also customers), and products/plans that the customer has subscribed to. The call data records for each customer may include records of all types of communications (e.g., voice, short message service (SMS) and multimedia messaging service (MMS) communications, etc.).

In the demonstrative example implementation of system 100/churn risk analytics application 140, test data analysis was directed to a customer retention marketing campaign use case or scenario, which involves identifying and contacting the top "at-risk" customers with promotional offers to help retain them. The goal of data analysis was to identify the most influential and valuable customers who are at high risk of churning.

To accomplish this, churn risk analytics application 140 was configured to analyze the call data records and customer records, and calculate the following three measures to formulate an overall churn risk score:

Churn Likelihood—the probability that a customer is likely to churn in the near term.

Influence Factor—the level of influence of the customer compared to other customers.

Average Spend—the average amount billed per billing period to the customer or customer's account.

For churn likelihood measure, churn risk analytics application 140 was configured to analyze each customer's call network for non-customer influencers (e.g., communications to/from contacts on another telecommunications carrier) and neighborhood churn (i.e. communications to/from contacts who are now former customers). In addition, family members of the customer were factored in as having a particularly strong influence in a neighborhood churn analysis.

For the influence factor measure, churn risk analytics application 140 was configured to consider several social network analysis metrics to calculate an individual influence factor rating for each customer. The social network analysis metrics included a degree centrality, a call frequency, a weight of communications (influenced by call type and duration) and a ratio of incoming/outgoing communications. The influence factor "In" for a customer "n" was computed by equation I:

$$I_n = D_n \times W_n \times R_n \quad \text{(I)}$$

where: $D_n$ is the degree centrality for customer n;
$W_n$ is the combined weight of communications for customer n (incorporating call type, frequency and duration); and
$R_n$ is the reciprocal factor for customer n (based on a ratio of incoming/outgoing communications).

In the foregoing equation I, the degree centrality D is the total number of contacts for all call types (including both incoming and outgoing communications). In other words, $D_n$ represents the total number of callers/callees with whom customer n has communicated. The combined weight of communications $W_n$ is the weighted sum for all voice, SMS and MMS communications. For SMS communications (and similarly for MMS) of customer n, a weight $S_n$ was calculated using equation II:

$$S_n = (\alpha \text{Sin}_n + \beta \text{Sout}_n) \times S \quad \text{(II)}$$

where:
$\alpha$ is an incoming factor indicating the importance of incoming communications, $0 \leq \alpha \leq 1$ (default value=0.5);
$\beta$ is an outgoing factor indicating the importance of outgoing communications, $0 \leq \beta \leq 1$ (default value=0.5) such that $\alpha + \beta = 1$;
$\text{Sin}_n$ is the total number of incoming SMS communications for customer n;
$\text{Sout}_n$ is the total number of outgoing SMS communications for customer n; and
S is the weight factor for SMS (default value=1).

For voice communications of customer n, the weight $S_n$ was adjusted to factor in the call duration. Voice calls were assigned a base weight $S_n$ (default value=2) and for each increment above a standard call duration (e.g., 5 minutes), an increment weight is added to the base weight.

Further, in the foregoing equation (I), the reciprocal factor $R_n$ for customer n was based on the ratio of incoming and outgoing communications, factoring in call frequency. For customer n, the reciprocal factor $R_n$ was calculated using equation III:

$$R_n = (\text{In} \times \text{Out}_n)/(\text{In} + \text{Out}_n)^2 \quad \text{(III)}$$

where: In is the total number of incoming communications for customer n; and

Outn is the total number of outgoing communications for customer n.

For average spend measure, churn risk analytics application 140 was configured to calculate the average amount billed per customer per billing period. The calculation included all product subscriptions (e.g. home phone, mobile, broadband, cable, etc.) for a given customer.

Figure 2:
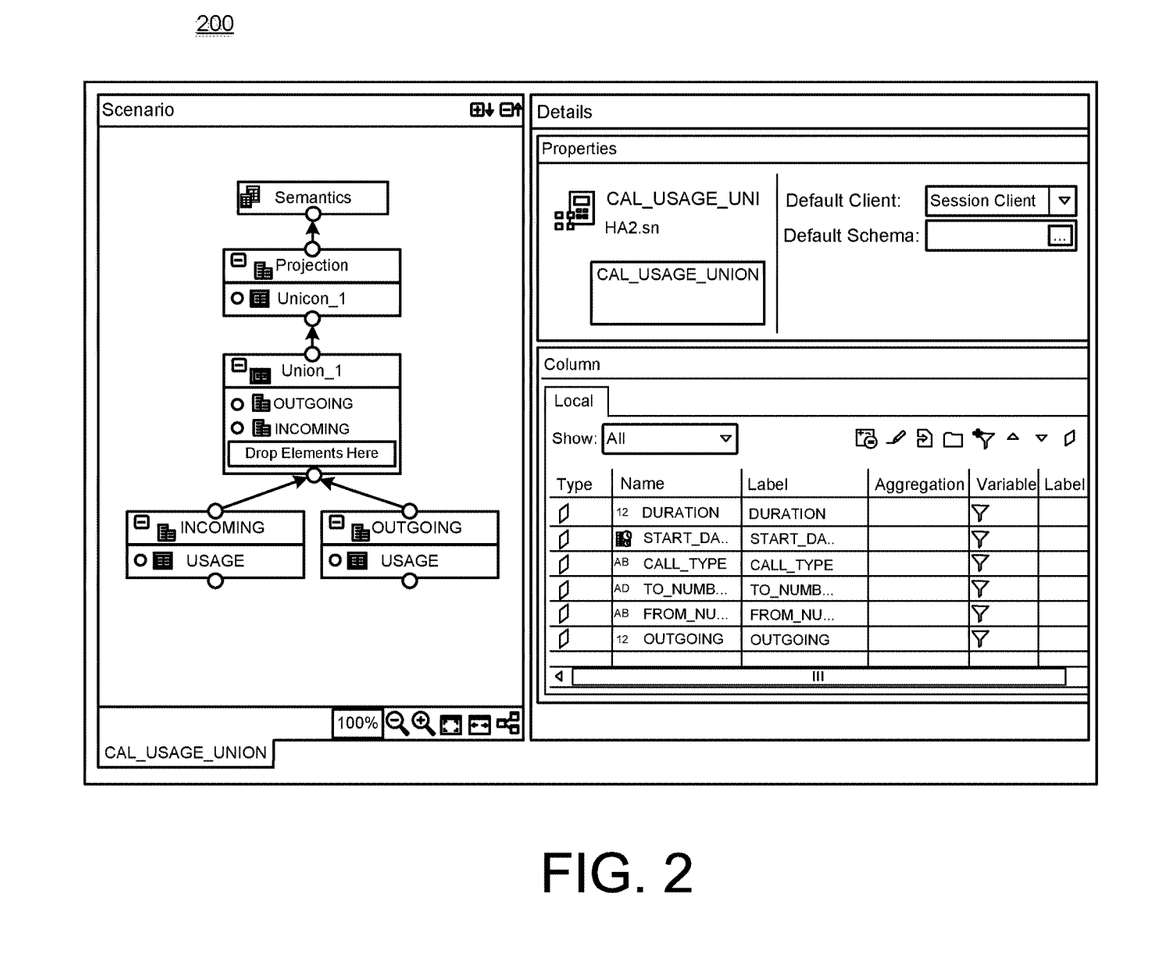
FIG. 2 is an example screenshot of an example calculation view of the churn risk analytics application of FIG. 1, in accordance with the principles of the present disclosure.

In the demonstrative example implementation of system 100, churn risk analytics application 140 was configured to present several complex calculation views on its user interface (e.g. UI 142). FIG. 2 shows a screenshot of an example calculation view. The calculation views are subsequently consumed by churn risk analytics application 140 via Open Data Protocol (OData).

Figure 3A:
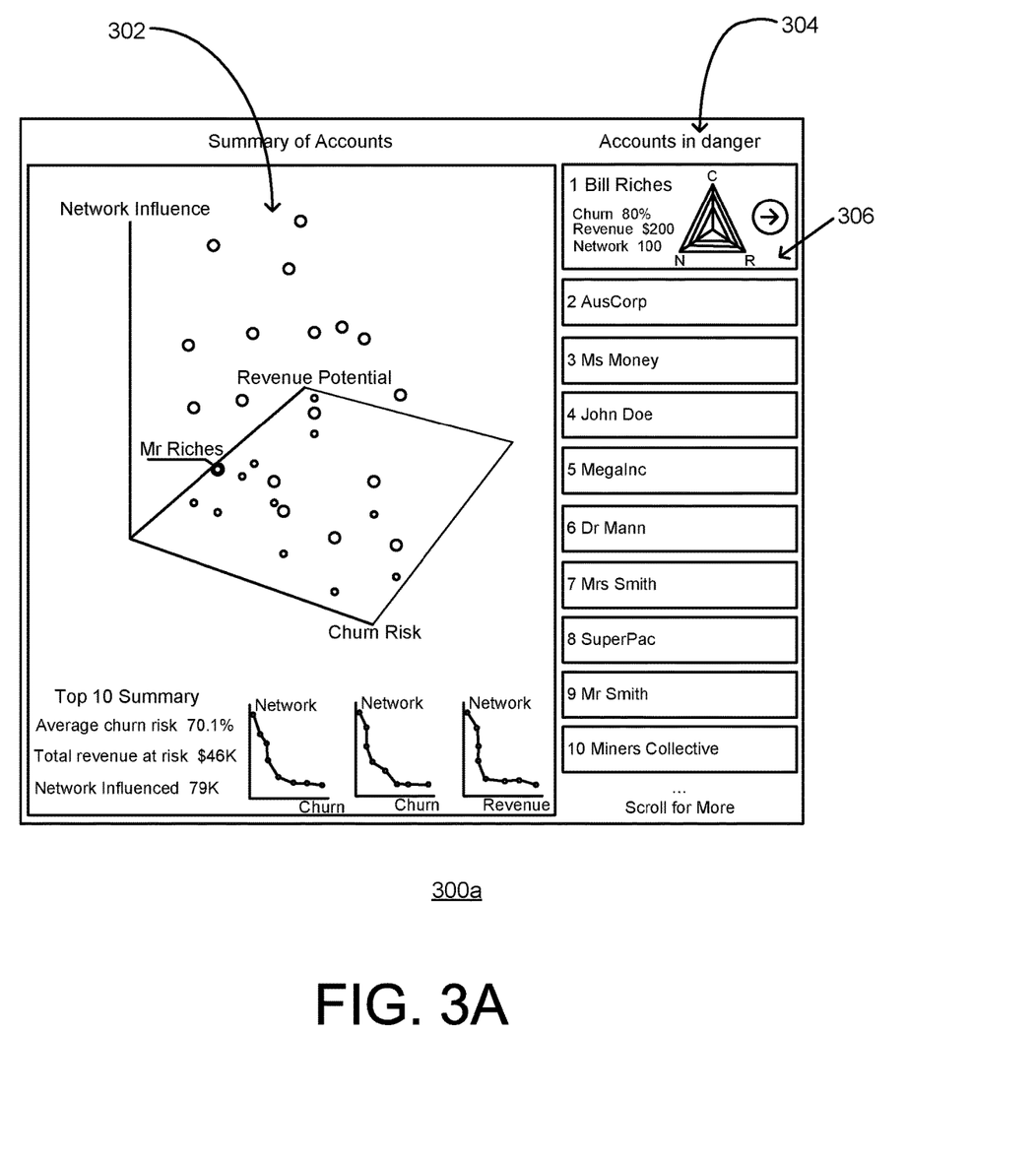
FIG. 3a illustrates a 3-D graphic visualization screen, which may be displayed by the churn risk analytics application (of FIG. 1) in its frontend user interface, in accordance with the principles of the present disclosure.

As noted previously churn risk analytics application 140/UI 142 may be configured to display visual call network analysis in 3-D, allow a user to identify high-risk churn customers intuitively, and to drill-down for calculation details FIG. 3a shows an example 3-D graphic visualization screen 300a that may be displayed in UI 142 by churn risk analytics application 140, in accordance with the principles of the present disclosure.

Example screen 300a may show the churn risk scores or values for customers who are at heightened risk of churning in an interactive 3-D graph 302. The at-risk customers may be ranked in ordered list 304. Graph 302 may be rendered in three dimensions (e.g., churn risk, network influence and revenue potential dimensions). Graph 302 in screen 300a may be configured to allow a viewer to use UI operations (e.g., rotate, zoom, flatten to two dimensions, etc.) to explore the displayed customer data. When the viewer selects a customer (e.g., "Bill Riches" from ordered list 304) on screen 300a, details 306 of the corresponding customer account may be displayed on UI 142. From screen 300a, the viewer can drill down to the subsequent pages of the display, which may, for example, present detailed information on each axis or dimension of graph 302.

Figure 3B:
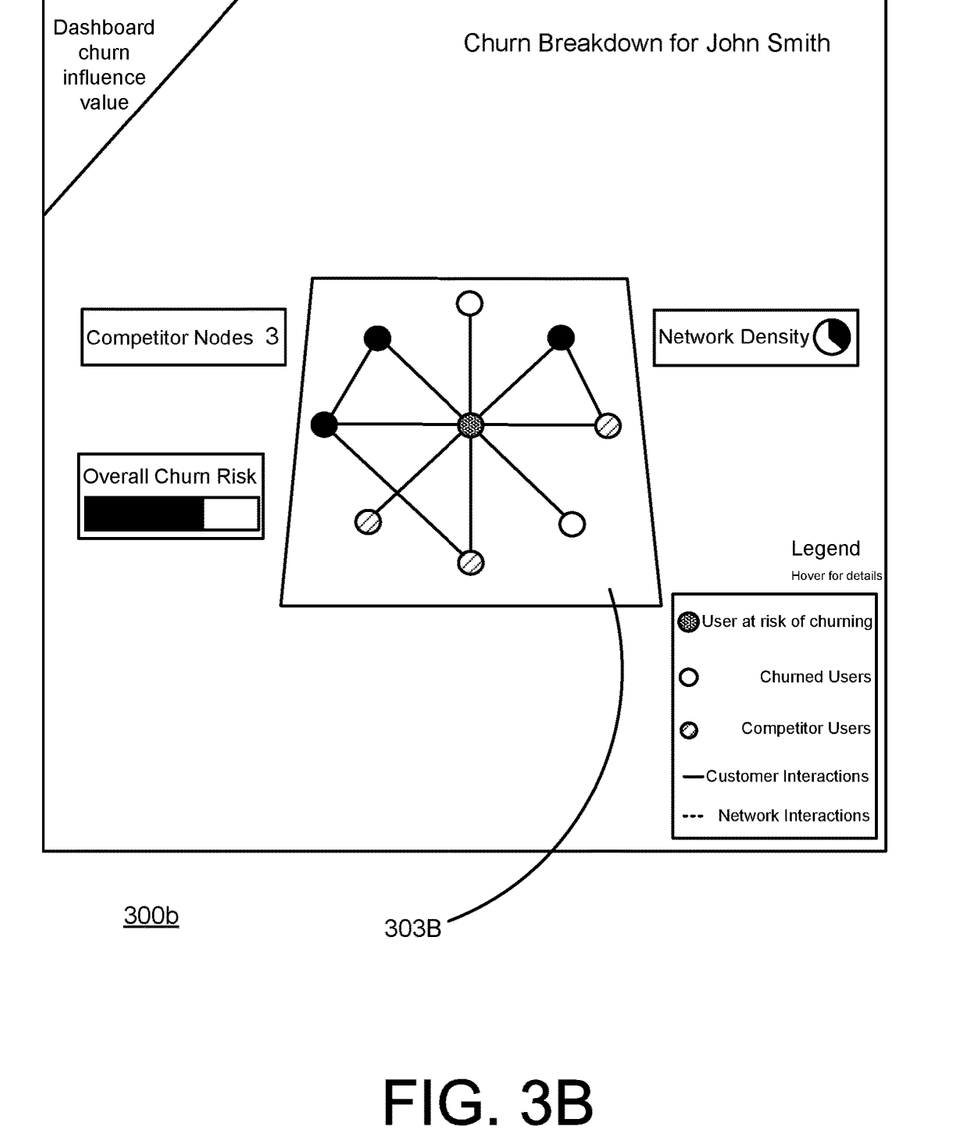
FIG. 3b illustrates another visualization screen including a graph for "churn," which may be displayed by the churn risk analytics application (of FIG. 1) in its frontend user interface, in accordance with the principles of the present disclosure.
Figure 3C:
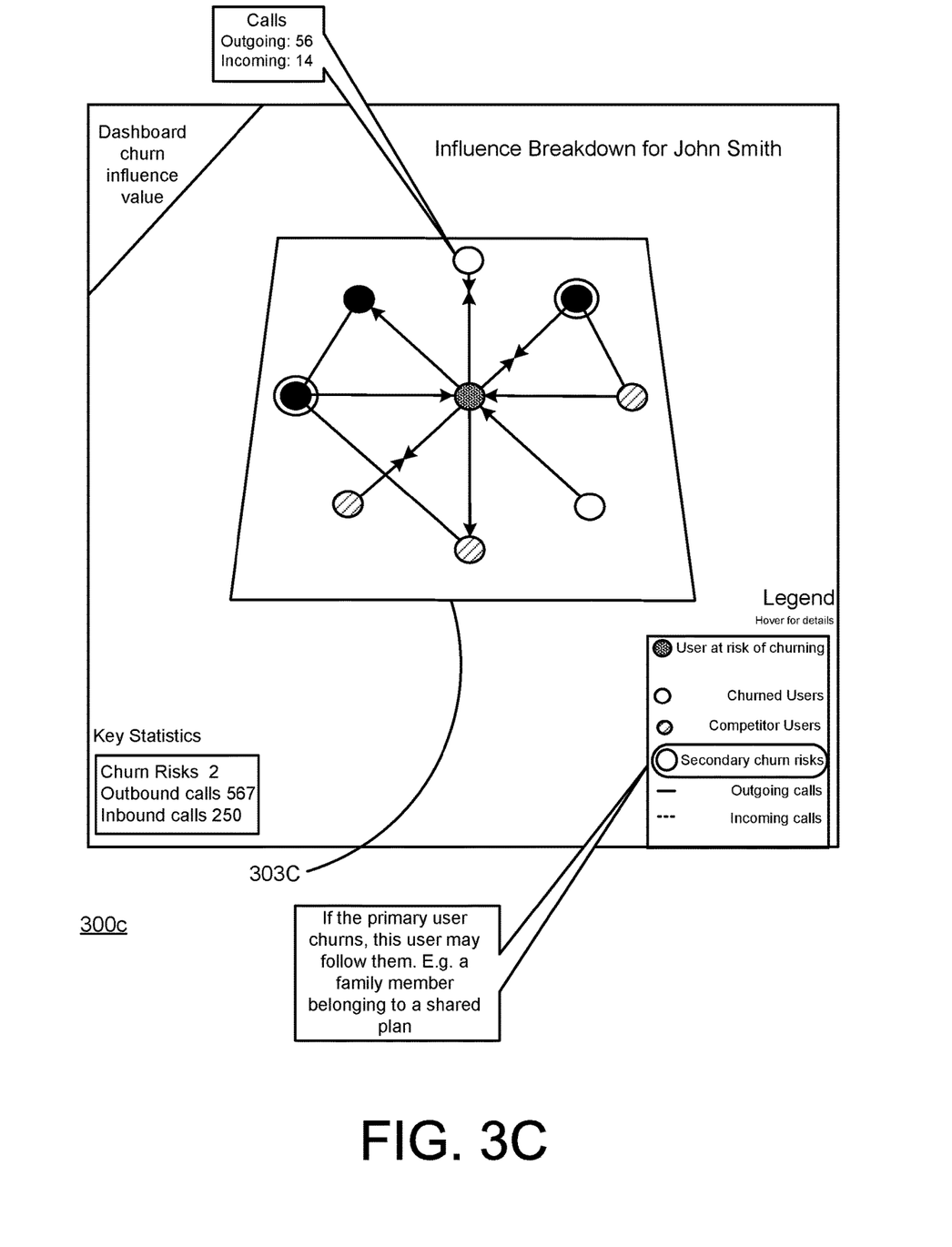
FIG. 3c illustrates yet another visualization screen including a graph for "influence," which may be displayed by the churn risk analytics application (of FIG. 1) in its frontend user interface, in accordance with the principles of the present disclosure.
Figure 3D:
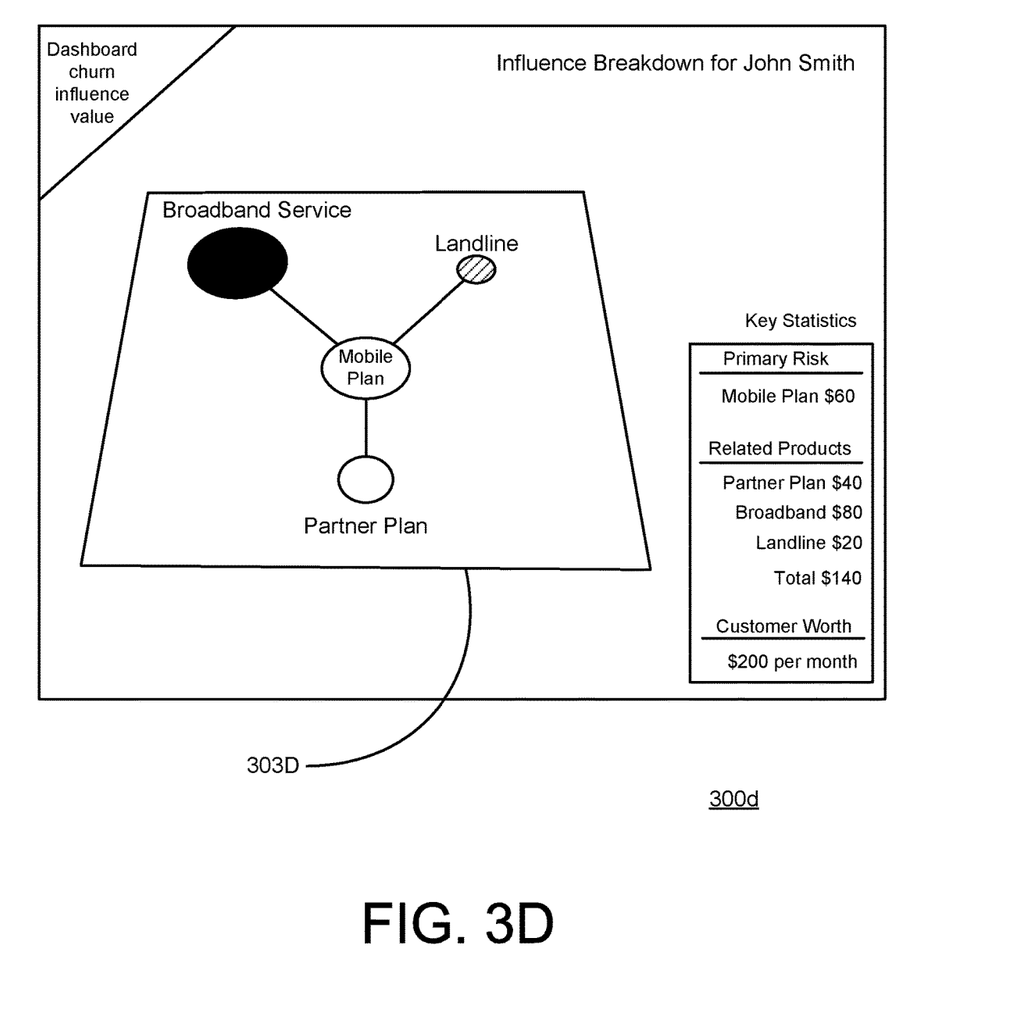
FIG. 3d illustrates still another visualization screen including a graph for "value," which may be displayed by the churn risk analytics application (of FIG. 1) in its frontend user interface, in accordance with the principles of the present disclosure.

FIGS. 3b-3d shows example graphic visualization screens 300b, 300c, and 300d that may be displayed by churn risk analytics application 140 in UI 142, in accordance with the principles of the present disclosure.

Example screens 300b-300d may be examples of the detailed information which may be displayed when the viewer drills down interactive 3-D graph 302/screen 300a. For example, screens 300b-300d may include graphs 303b-303d that illustrate or give breakdown of the components of graph 302 dimensions "churn", "influence" and "value," respectively, for a selected customer (e.g., customer "John Smith").

Screen 300b "churn breakdown" may be displayed, for example, when the viewer selects a node (i.e. customer "John Smith) from screen 300a. Screen 300b may include graph 303b, which shows customer John's network interactions or connections with other customers. The network connections and nodes may be color-coded to visually indicate, for example, network connections to other present customers of the telecommunication company, to customers who have already churned, and to customers of competitor carriers. Graph 303b may visually represent reasons why the customer account may churn away from the current network. For example, if customer John Smith has a dense network of interactions with other customers/contacts on the same telecommunication company network, customer John Smith may be less likely to churn as he may have a greater ecosystem buy in. Conversely, if many of customer John Smith's interactions are with customers on competitor networks, customer John Smith may be susceptible to churn away from the current network, for example, to take advantage of discounts which may be possibly available on the competitor networks or hear of from the customers on competitor networks.

Screen 300c "influence breakdown" may include graph 303c, which shows other customers with incoming calls from and outgoing calls to customer John Smith. Like in graph 303b, customers in graph 303c may be color-coded to visually indicate, for example, other present customers of the telecommunication company, customers who have already churned, and customers of competitor carriers. Graph 303b may visually represent how the selected customer (e.g., customer John Smith) may be influenced by other customers, or may be influencing the other customers. The selected customer (e.g., customer John Smith) may have a high influence if he or she frequently calls, or is called by other customers. In addition, graph 303c, as shown on screen 303c in FIG. 3c, may bring forth secondary churn risks that may not be immediately apparent (e.g., from the volume of calls). For example, if a parent with a mobile phone account pays for a child to have a partner mobile phone (FIG. 3d), they are likely to churn both accounts at the same time—a secondary churn risk which may not be immediately apparent from the volume of calls between the two.

Further, screen 300d "value breakdown" may graphically display values of individual plans or products (e.g., broadband service, landline, mobile plan, partner plan, etc.) that may be bundled in the customer account (e.g., customer John Smith's account). If the customer is dissatisfied with an individual plan or product in their account, it is likely he or she will churn the entire account. Screen 303d may specifically display a total value or worth of the customer account that may be at stake if the customer churns.

Figure 4:
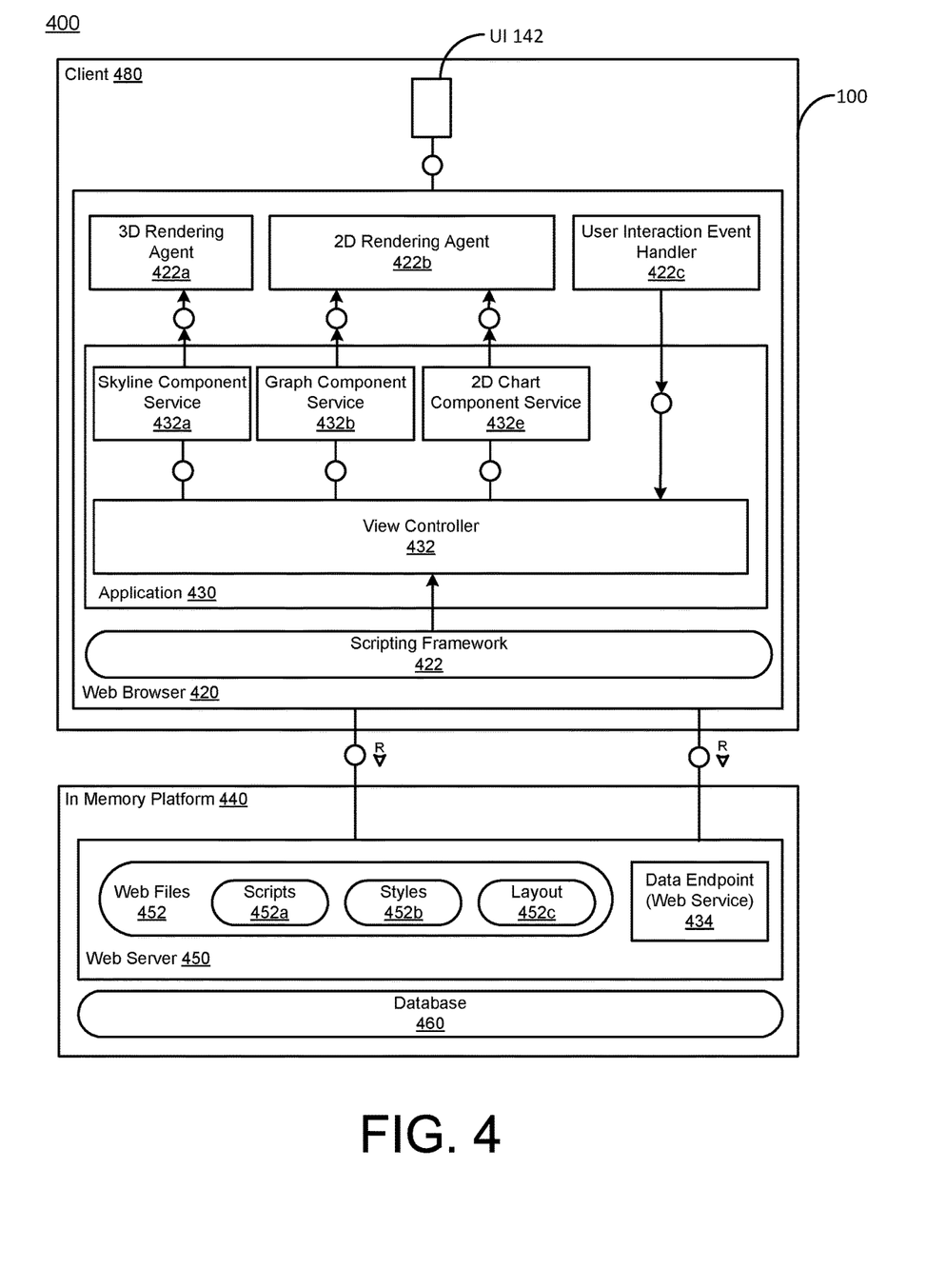
FIG. 4 is a block diagram representation of example architectural elements or structures of a system supporting an application frontend user interface capable of model-based 3-D visualization of churn risk analysis and information, in accordance with the principles of the present disclosure.

FIG. 4 shows a block diagram 400 representation of example architectural elements or structures of system 100 supporting an application frontend user interface (e.g. UI 142) capable of model-based 3-D visualization of churn risk analysis and information, in accordance with the principles of the present disclosure. Block diagram 400 is shown in the figure using, for example, "Fundamental Modeling Concepts" (FMC) notation, which may allow separate depiction of conceptual structures and implementation structures in the block diagram.

As shown in block diagram 400, system 100 may include an in-memory platform 440, which hosts or supports a web-based churn risk analytics application 430 (e.g., application 140) configured to display visual call network analysis or information on a UI (e.g., UI 142) of a client device 480 (e.g., computing device 110).

Client device 480 may include a web browser 420, which may present or access a web-based churn risk analytics application web site or web page through which a user may interact with or control operation of web-based churn risk analytics application 430.

Web browser 420 may include a scripting framework 422 (e.g., class libraries and runtime environment) which provides scripting language support within, for example, churn risk analytics application 430. Web browser 420 may further include rendering agents (e.g., 3D rendering agent 422a, 2D-rendering agent 422b) configured to render view scripts on UI 142, for example, as 3D graphs, 2D graphs or 2D charts.

As shown in the figure, in-memory platform 440 may include a web server 450 and a database 460 (e.g., database 120), which may store data (e.g., call data records, customer data, etc.) that may be consumed in or generated by the churn risk analysis. Web server 450 may store web files 452 (e.g., scripts 452*a*, styles 452*b* and layout 452*c*), which may be used, for example, to construct the churn risk analytics application web site or web page through which the user may interact with or control operation of churn risk analytics application 430. Web server 450 may also include a data endpoint 434 (e.g., a URL), which may serve as an entry point for a web service requested by other entities (e.g., web browser 420).

Web-based churn risk analytics application 430 may include one or more components for data presentation or visualization services (e.g., a 3-D visualization component service 432*a*, a graph component service 432*b* and a 2-D Chart component service 432*c*, etc.) supervised by a controller 432. Controller 432, which may (e.g. in response to user interaction/event handler 422*c* in web browser 420) command or request one or more application services (e.g., a 3-D visualization component service 432*a*, graph component service and 2-D Chart component service 432*c*) for view scripts to display information on UI 142 (e.g., as 3D graph 302, 2D graphs 303*b*-303*d*, etc.).

In the example implementation of system 100 (described in the foregoing under the section heading Example Implementation), the UI for churn analytics (e.g., UI 142) was built, for example, using the latest standards of web development (e.g., collectively known as HTML5) augmented with the use of various libraries to speed development time. Web-based churn risk analytics application 430 was built, for example, using the "AngularJS" framework as a layer on top of javascript to provide Model-View-Controller (MVC) style development. Parts of the "Foundation" library were used to enhance usability of CSS3 features to provide layout and then augmented with custom styling. "ThreeJS" was used to allow easy access to WebGL for the three dimensional graphing of points on the 3-d graph (e.g., graph 302) and D3 was used to provide easy data management for implementation of the 2d graphs (e.g., graphs 303*a*-303*d*) on drill down. The 3-d graph itself was implemented using a particle cloud system to provide fast rendering of a large number of points. "JQuery" was used to provide a collection of helper functions not provided by other frameworks or the base language.

Example Use Scenario

The utility of system 100/churn risk analytics application 140 and UI 142 with its model-based 3-D visualization capabilities is illustrated in the following with reference to an example use scenario. In the example use scenario, a marketing manager (e.g., "Jim") at a telecommunication company may have been allocated a limited budget for a customer retention marketing campaign. The budget for the customer retention marketing campaign may not be large enough to cover all customers or customer accounts of the telecommunication provider company. Accordingly, Jim may need to limit the customer retention marketing campaign to target to only high churn risk and high value customers to maximize benefits of customer retention marketing campaign. The in-memory database platform implementation of churn risk analytics application 140 described herein, which processes big data (network data) in a manner not feasible by human mind or hand to generate risk scores, may be well suited for identifying high churn risk and high value customers.

Jim may launch churn risk analytics application 140 in system 100 to be promptly presented with example screen 300*a* in which the churn risk values for the most significant customers (304) who are at heightened risk of churning are displayed in an interactive 3-D graph 302. Further, screen 300*a*, as shown in FIG. 3*a*, may include an ordered list 302 of these "at-risk" customers or customer accounts. When Jim clicks on an item (e.g. customer or customer account "Bill Riches") churn risk analytics application 140 may be configured to display additional quantitative information 306 (e.g., Bill has an 80% likelihood of churning, has a network of 100 contacts and brings in $200 revenue), which may explain at a glance why Bill is a high churn risk and a high value customer. This information may be sufficient for Jim to include "Bill Riches" in his selection of customers to be targeted by the customer retention marketing campaign.

In the example use scenario, Jim may still like to get more information about the churn risk, influence and value of this customer. Jim may drill down on this customer account on UI 142 to see new screens (e.g., screens 300*b*-300*d*) showing breakdowns for churn risk, customer influence, and customer value dimensions of the churn risk score generated by computed by churn risk analytics application 140.

Jim may switch between screens 300*b*-300*d* to visually gather the displayed information therein to further inform decisions on which customers he should target for the customer retention marketing campaign or on how to modify or customize the customer retention marketing campaign for particular customers.

Figure 5:
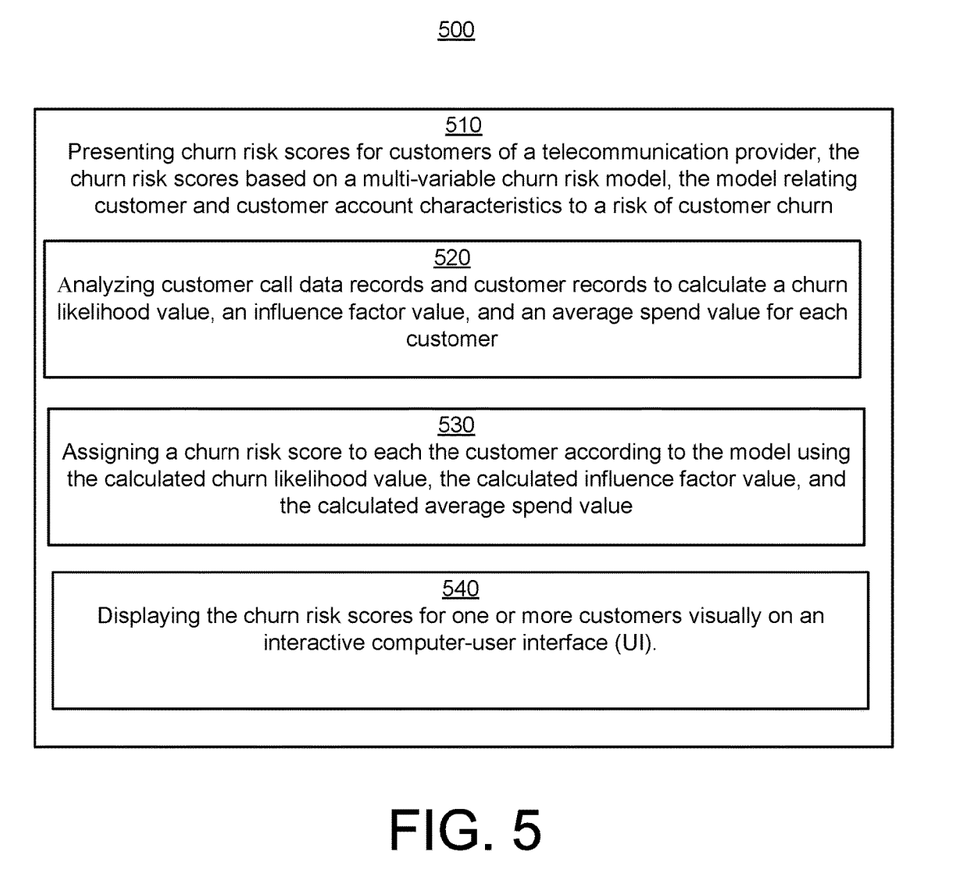
FIG. 5 illustrates an example computer-implemented method for generating values of parameters of a multi-variable churn risk model and model-based customer account churn risk scores, and displaying the same in an interactive user interface having model-based 3-D visualization capabilities, in accordance with the principles of the present disclosure.

FIG. 5 shows an example computer-implemented method 500 for generating churn risk scores using a multi-variable churn risk model and displaying the same in an interactive user interface having model-based 3-D visualization capabilities, in accordance with the principles of the present disclosure.

Method 500 includes generating and presenting churn risk scores for customers of a telecommunication provider (510). The churn risk scores may be based on an empirical multi-variable churn risk model relating customer and customer account characteristics to a risk of churn. Method 500 involves analyzing customer call data records and customer records to calculate a churn likelihood value, an influence factor value, and an average spend value for each customer (520), and further assigning a churn risk score to each customer using the calculated churn likelihood value, the calculated influence factor value, and the calculated average spend value as input to the multi-variable churn risk model (530). Method 500 further includes displaying the churn risk scores for one or more customers visually on an interactive computer-user interface (UI) (540).

In method 500, displaying the churn risk scores for one or more customers visually on an interactive computer-user interface 540 may include displaying an ordered list of at-risk customers or customer accounts and displaying the churn risk scores in a 3-dimensional graph with the churn likelihood, the influence factor, and the average spend variables as the graph axes Displaying the churn risk scores for one or more customers visually on an interactive computer-user interface 530 may also include displaying a calculation view on the UI and consuming the calculation view in analyzing customer call data records and customer records via Open Data Protocol (OData).

Method 500 may also include configuring UI operations to enable a viewer to explore the displayed customer data and the underlying model calculations, and providing drill down support on the UI to show, for example, individual graphs depicting individual call networks of the one or more customers.

Further in method 500, analyzing customer call data records and customer records database may include using social network analysis techniques to extract the one or more customers' social call networks, and may include displaying the one or more customers' social call networks on the UI (e.g., in graphs).

The various systems and techniques described herein may be implemented in digital electronic circuitry, or in computer hardware, firmware, or in combinations of them. The various techniques (e.g., method 500) may implemented via a computer program product, i.e., a computer program with instructions tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
presenting an interactive computer-user interface (UI) of a web-based churn risk analytics application,
the interactive UI including a web page with user controls of operations of the web-based churn risk analytics application;
analyzing, by the web-based churn risk analytics application, on an in-memory database platform, multiple data sources including customer call data records and customer records related to call networks of a telecommunication provider to calculate a churn likelihood value, an influence factor value, and an average spend value for each customer;
assigning multiple churn risk scores to each customer according to a multi-variable churn risk model relating customer and customer account characteristics to a risk of customer churn, the multi-variable churn risk model using, as inputs, the calculated churn likelihood value, the calculated influence factor value, and the calculated average spend value and producing, as outputs, the multiple churn risk scores;
displaying the multiple churn risk scores and churn risk calculations as a three dimensional visualization on the interactive UI to identify at risk customers in real time or near real time; and
providing drill-down support on the interactive UI, the drill-down support including a churn breakdown graph depicting connections between a customer and other users and an influence breakdown graph depicting incoming and outgoing calls between a customer and other users.

2. The method of claim 1, wherein displaying the multiple churn risk scores and churn risk calculations as a three dimensional visualization includes displaying a calculation view on the UI and consuming the calculation view in analyzing customer call data records and customer records via Open Data Protocol (OData).

3. The method of claim 1, wherein displaying the multiple churn risk scores and churn risk calculations as a three dimensional visualization includes displaying the churn risk scores in a 3-dimensional graph with the churn likelihood, the influence factor, and the average spend variables as the graph axes.

4. The method of claim 3, wherein displaying the multiple churn risk scores and churn risk calculations as a three dimensional visualization for one or more customers visually on an interactive computer user interface includes displaying an ordered list of at-risk customers or customer accounts.

5. The method of claim 3, wherein displaying the multiple churn risk scores and churn risk calculations as a three dimensional visualization includes configuring UI operations to allow a viewer to explore the displayed customer data and the underlying model calculations.

6. The method of claim 3, wherein displaying the multiple churn risk scores and churn risk calculations as a three dimensional visualization includes providing drill down support on the UI to show individual graphs depicting individual call networks of the one or more customers.

7. The method of claim 1, wherein analyzing customer call data records and customer records database includes using social network analysis techniques to extract the one or more customers' social call networks.

8. The method of claim 7 further comprising displaying the one or more customers' social call networks on the UI in graphs.

9. The method of claim 7 further comprising, using social network analysis measures including at least a connectedness measure to characterize the one or more customers' social call networks.

10. The method of claim 9 further comprising using social network analysis measures to calculate the influence factor value.

11. A computer system comprising a memory and a semiconductor-based processor, the memory and the processor forming one or more logic circuits configured to at least:
  present an interactive computer-user interface (UI) of a web-based churn risk analytics application,
  the interactive UI including a web page with user controls of operations of the web-based churn risk analytics application;
  analyze, by the web-based churn risk analytics application, multiple data sources including customer call data records and customer records related to call networks of a telecommunication provider to calculate a churn likelihood value, an influence factor value, and an average spend value for each customer;
  assign multiple churn risk scores to each customer according to a multi-variable churn risk model relating customer and customer account characteristics to a risk of customer churn, the multi-variable churn risk model using, as inputs, the calculated churn likelihood value, the calculated influence factor value, and the calculated average spend value and producing, as outputs, the multiple churn risk scores;
  display the multiple churn risk scores and churn risk calculations as a three dimensional visualization on the interactive UI to identify at risk customers in real time or near real time; and
  provide drill-down support on the interactive UI, the drill-down support including a churn breakdown graph depicting connections between a customer and other users and an influence breakdown graph depicting incoming and outgoing calls between a customer and other users.

12. The computer system of claim 11, wherein the logic circuits are configured to display a calculation view on the UI and consuming the calculation view in analyzing customer call data records and customer records via Open Data Protocol (OData).

13. The computer system of claim 11, wherein the logic circuits are configured to display the churn risk scores in a 3-dimensional graph on the UI with the churn likelihood, the influence factor, and the average spend variables as the graph axes.

14. The computer system of claim 11, wherein the logic circuits are configured to display an ordered list of at-risk customers or customer accounts.

15. The computer system of claim 11, wherein the logic circuits are configured to enable UI operations to allow a viewer to explore displayed churn risk scores and the underlying model calculations.

16. The computer system of claim 11, wherein the logic circuits are further configured to provide drill down support on the UI to show individual graphs depicting individual call networks of the one or more customers.

17. The computer system of claim 11, wherein the logic circuits are further configured to analyze customer call data records and customer records database by using social network analysis techniques to extract the one or more customers' social call networks.

18. The computer system of claim 17, wherein the logic circuits are further configured to display the one or more customers' social call networks on the UI in graphs.

19. A non-transitory computer readable storage medium having instructions stored thereon, including instructions which, when executed by a microprocessor, cause a computer system to at least:
  present an interactive computer-user interface (UI) of a web-based churn risk analytics application,
  the interactive UI including a web page with user controls of operations of the web-based churn risk analytics application;
  analyze, by the web-based churn risk analytics application, multiple data sources including customer call data records and customer records related to call networks of a telecommunication provider to calculate a churn likelihood value, an influence factor value, and an average spend value for each customer;
  assign multiple churn risk scores to each customer according to a multi-variable churn risk model relating customer and customer account characteristics to a risk of customer churn, the multi-variable churn risk model using, as inputs, the calculated churn likelihood value, the calculated influence factor value, and the calculated average spend value and producing, as outputs, the multiple churn risk scores; and
  display the multiple churn risk scores and churn risk calculations as a three dimensional visualization on the interactive UI to identify at risk customers in real time or near real time; and
  provide drill-down support on the interactive UI, the drill-down support including a churn breakdown graph depicting connections between a customer and other users and an influence breakdown graph depicting incoming and outgoing calls between a customer and other users.

20. The non-transitory computer readable storage medium of claim 19, wherein the instructions, when executed by a microprocessor, further cause the computer system to:
  display the churn risk scores in a 3-dimensional graph with the churn likelihood, the influence factor, and the average spend variables as the graph axes.

* * * * *